Patented June 6, 1950

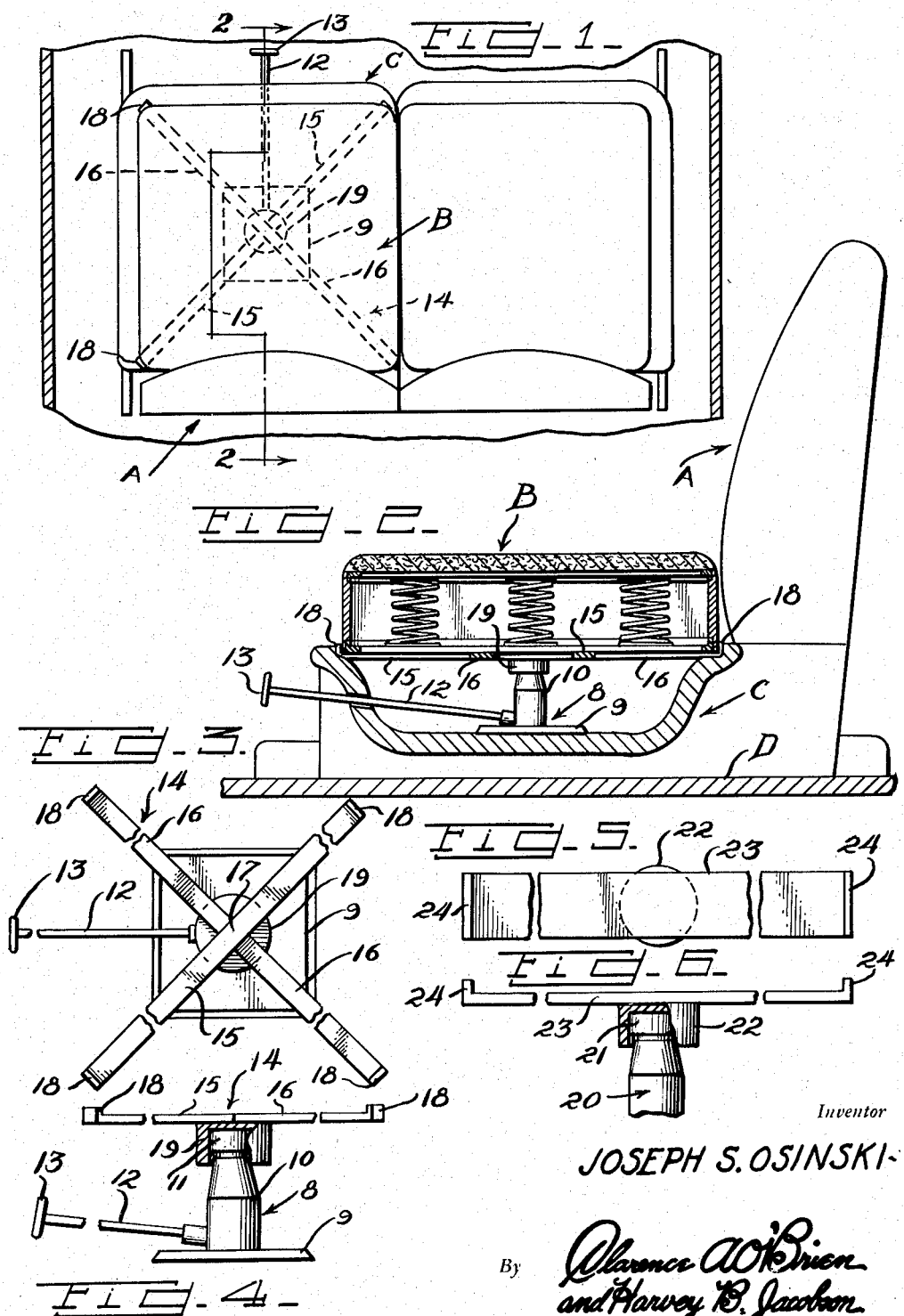

2,510,517

UNITED STATES PATENT OFFICE 2,510,517

SEAT CUSHION ADJUSTING MEANS

Joseph S. Osinski, Cheektowaga, N. Y.

Application August 26, 1946, Serial No. 693,082

3 Claims. (Cl. 155—88)

The present invention relates to novel and improved adjusting means for seat cushions such as are used in seat constructions in automobiles, and the like, and has reference, in particular, to hand regulated adjusting means which is introduced and interposed between the stationary base or underframe and cushion, and which serves to vertically raise and lower the cushion in a manner to place it at a correct level for safe and reliable driving.

More specifically, the invention pertains to a suitable lifting and lowering jack, readily accessible operating means for the jack, and an adapter mounted on the head of the jack and coacting directly with the cushion in a manner to provide an adjustable foundation for said cushion and to allow same to be raised or lowered to meet the requirements of the occupant.

Certain makes of present-day automobiles, particularly coaches and other styles having twin or double seats at the front, are often such that the driver is compelled to sit on a level which makes it impossible to obtain a clear and ready view of the complete radiator and fenders. Experience has shown that this low-level principle is not only objectionable but is highly unsafe. Consequently, many accidents can be traced to this low-seating arrangement. It follows, therefore, that my aim is to provide means which can be installed in already marketed cars and which, in an equivalent form, might well be installed in cars at the time of manufacture, the attainable results being such as to promote safe and reliable driving requirements.

Other objects, features and advantages of the invention will become more readily apparent from the following description and the accompanying illustrative drawing.

In the drawing, wherein like numerals are employed to designate like parts throughout the views—

Figure 1 represents a fragmentary portion of the front seat construction of an automobile with the cushion on one of the seats equipped with my improved adjusting and hoisting means.

Figure 2 is a view in section and elevation, the same being taken approximately on the plane of the line 2—2 of Figure 1, looking in the direction of the arrows.

Figure 3 is a top plan view of the invention per se, detached from the rest of the structure.

Figure 4 is a side view of the structure seen in Figure 3 with a portion shown in section.

Figure 5 is a top plan view of a slightly modified form of the invention.

Figure 6 is a view of a fragmentary elevational and sectional side, this being based on the simplified modification in Figure 5.

In Figure 2, where the general assembly is best shown, the backrest of the seat structure is denoted at A, the seating cushion is indicated at B, and the relatively stationary base frame for said cushion is denoted at C. The floor of the automobile is indicated at D.

As shown in Figures 3 and 4, the lifting and lowering means is in the form of a jack, this being an ordinary lifting jack and denoted generally by the numeral 8. The base of the jack is denoted at 9 and the standard at 10. The adjustable lifting and lowering head is denoted at 11. The numeral 12 designates an operating rod which is operatively connected with the mechanism of the jack and is provided on its outer end with a hand-wheel or equivalent part 13 which is accessible to the occupant of the seat, as evidenced from Figures 1 and 2.

The aforementioned seat cushion adapter unit is denoted, generally speaking, by the numeral 14 and in the form of the invention seen in Figures 1 to 4, inclusive, comprises a frame made up of strap metal arms 15 and 16 welded or otherwise connected together, as at 17, in crossed form. Thus, the frame is of general cruciform design in top plan and the extreme outer ends of the respective arms are upturned to provide retaining and assembling lugs 18. These lugs engage the marginal coacting portions of the cushion B. Welded to the underside of the cruciform frame is a cup 19 which fits down over the head of the jack, as shown in Figure 4. The jack, incidentally, is of either mechanical, pneumatic, or hydraulic form and is, of course, not claimed here except in the broad sense, that is, as a lifting jack. The essence of the invention, therefore, comprises a jack which is seated on the base C, which is provided with manual operating means accessible through the front of said base, just below the driver of the car, said jack being provided with the adapter means 14 which serves to accommodate the cushion. It follows, therefore, that the invention has to do with a lifting and lowering jack having accessible operating means, said jack interposed between the cushion and its base and being provided with an adapter device for coaction with the cushion. Hence, the cushion can be vertically raised to take a predetermined position such as is required by the particular user for safe vision and driving.

In the modification seen in Figures 5 and 6, the construction is basically the same and the jack is denoted by the numeral 20, the same having a head 21 fitting in a cup 22 on the central underside of a single bar or strap member 23. Here again the strap member is provided at its outer ends with upturned hooks or lugs 24 for coaction with the cushion. In both forms of the invention, the cup-equipped device is, generally speaking, an adapter with an arm or arms, said arm or arms having hooks or lugs engageable with the cushion.

It is submitted that the invention is characterized by simplicity, durability and reliability in construction and use. Its employment in automobiles will fulfill a long-felt need and will serve to add greatly to the safe driving campaign currently in vogue by and in behalf of motorists.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claims.

I claim:

1. In a cushioned automobile seat structure of the class described, a frame lifting and lowering jack, manually controlled operating means for said jack, a cruciform frame made up of complemental members having their outer ends upturned to provide retaining lugs for the co-acting seat, and a centralized cup on said cruciform frame removably engageable with a part of the jack.

2. In a structure of the class described, a lifting and lowering jack, frame means including a bar member having upturned terminal ends and a cup on the underside of said bar member releasably engageable with a reciprocable part of the jack.

3. In an adjustable automobile seat construction including independently usable multiple seats, a relatively fixed base construction, a backrest attached rigidly to and rising from said base construction, an independent cushioned seat removably arranged on said base construction, an adapter frame of cruciform shape and made up of complemental members having their outer ends upturned and engaging marginal edge portions of said seat to hold the seat in the frame, a frame and seat lifting and lowering jack of an extensible and retractible type arranged beneath the seat and interposed between the frame and base construction, the reciprocating part of the jack being operatively connected with the central portion of said frame for lifting and lowering the frame on an even keel to vary the elevation of the seat to suit the requirements of the driver, and operating means for the jack connected with the jack and also mounted in the base construction and readily available to the occupant of the seat, positioned below the plane of the bottom of said seat.

JOSEPH S. OSINSKI.

REFERENCES CITED

The following references are of record in the file of this patent:

UNITED STATES PATENTS

| Number    | Name    | Date          |
|-----------|---------|---------------|
| 688,185   | Luria   | Dec. 3, 1901  |
| 1,688,956 | Bendix  | Oct. 23, 1928 |
| 1,855,245 | Kuenzel | Apr. 26, 1932 |
| 1,999,848 | Rifs    | Apr. 30, 1935 |